United States Patent
Wei et al.

(10) Patent No.: US 6,905,627 B2
(45) Date of Patent: Jun. 14, 2005

(54) ETCHING METHOD FOR FABRICATING HIGH QUALITY OPTICAL FIBER PROBE

(75) Inventors: Pei-Kuen Wei, Taipei (TW); Yi-Chun Chen, JungHe (TW)

(73) Assignee: Academia Sinica, Taipei (TW)

( * ) Notice: Subject to any disclaimer, the term of this patent is extended or adjusted under 35 U.S.C. 154(b) by 187 days.

(21) Appl. No.: 10/340,572

(22) Filed: Jan. 10, 2003

(65) Prior Publication Data

US 2004/0134884 A1 Jul. 15, 2004

(51) Int. Cl.[7] .............. B44C 1/22; C23F 1/02
(52) U.S. Cl. ............... 216/97; 216/11; 216/83; 156/345.11
(58) Field of Search ............. 216/11, 83, 97; 156/345.11

(56) References Cited

U.S. PATENT DOCUMENTS

| | | | |
|---|---|---|---|
| 4,469,554 A | 9/1984 | Turner | 156/657 |
| 5,985,166 A | 11/1999 | Unger et al. | 216/97 |
| 6,203,660 B1 | 3/2001 | Unger et al. | 156/345.11 |
| 6,280,647 B1 | 8/2001 | Muramatsu et al. | 216/92 |
| 2002/0081072 A1 * | 6/2002 | Ootsu et al. | 385/43 |

OTHER PUBLICATIONS

Lambelet et al., "Chemically etched fiber tips for near–field optical microscopy: a process for smoother tips," Applied Optics, vol. 37, No. 31, pp. 7289–7292, Nov. 1, 1998.
Zeisel et al., "Pulsed laser–induced desorption and optical imaging on a nanometer scale with scanning near–field microscopy using chemically etched fiber tips," Appl. Phys. Lett., vol. 68, No. 18, pp. 2491–2492, Apr. 29, 1996.

* cited by examiner

Primary Examiner—Shamim Ahmed
(74) Attorney, Agent, or Firm—Fish & Richardson P.C.

(57) ABSTRACT

Techniques for chemically etching a fiber tip to form a smooth fiber probe. One implementation applies a coating layer around a bare fiber to expose only an end facet of the bare fiber and then the exposed end facet is immersed into an etching liquid to be away from a meniscus interface between the etching liquid and the fiber to etch the fiber from the end facet.

20 Claims, 6 Drawing Sheets

FIG. 4A 30 min.

FIG. 4B 60 min.

FIG. 4C 90 min.

FIG. 4D

120 min.

ETCHING METHOD FOR FABRICATING HIGH QUALITY OPTICAL FIBER PROBE

BACKGROUND

This application relates to fabrication of fiber probes by chemical etching.

Tapered fiber probes may be formed by shaping one end of an optical fiber into a cone or tapered section. The end tip of the cone or tapered section may be used as a small optical aperture for coupling light either out of the fiber or into the fiber. In particular, the fiber tip may be used as an optical probe in a near-field configuration, where light is coupled over a spacing less than one wavelength of the coupled light, for various optical imaging or sensing applications. For example, such a fiber tip may be used in a near-field scanning optical microscope to achieve a spatial resolution higher than what is permissible by the far-field diffraction limit.

The quality of the fiber probes has been shown to have significant impact on the performance of a near-field system using a fiber probe. Various fabrication techniques have been developed to achieve a small, sharp fiber probe with a smooth side surface in the tapered section. In particular, chemical wet-etching techniques have been used to etch a bare fiber with a suitable etching liquid to fabricate the fiber probe. The etching liquid may be a solution with various active chemicals such as hydrofluoride acid (HF) or a mixture of an oxidizing acid and hydrogen peroxide. For example, U.S. Pat. No. 4,469,554 to Turner et al. and U.S. Pat. No. 5,985,166 to Unger et al. describe wet etching of a bare fiber at the meniscus interface of the etching liquid with the side of the bare fiber. Lambelet et al. also disclosed a fabrication method that uses the fiber jacket to better control the wet etching at the meniscus interface in "CHEMICALLY ETCHED FIBER TIPS FOR NEAR-FIELD OPTICAL MICROSCOPY: A PROCESS FOR SMOOTHER TIPS," Applied Optics, Vol. 37, pages 7289–7292 (1998).

SUMMARY

This application includes implementations of a fabrication technique based on wet etching from one end facet of the fiber. This end etching process does not rely on etching at the meniscus interface between the etching liquid and the fiber.

In one implementation of the end-etching process, a coating layer is applied around a bare fiber to expose only an end facet of the bare fiber. The exposed end facet is then immersed into an etching liquid to be away from a meniscus interface between the etching liquid and the fiber to etch the fiber from the end facet.

In another implementation of the end etching process, the etching may be performed as follows. First, a portion of a protective fiber jacket of a fiber is removed to expose one end section of the fiber. A coating is formed to cover at least a fiber cladding surface of the end section to expose only an end facet of the end section. The coating is designed to spatially regulate the etching of the fiber in an etching liquid. Next, the coated end of the fiber is submerged into the etching liquid to place the exposed end facet within the etching liquid and to be away from a meniscus interface so that the fiber is etched from the exposed end facet. After a desired fiber tip is formed by etching, the fiber is then removed from the etching liquid to terminate the etching process.

The above and other implementations, features, and associated advantages are described with greater details in the following drawings, the textual description, and the claims.

BRIEF DESCRIPTION OF THE DRAWINGS

FIGS. 3A, 3B, and 3C illustrate one example of the implementation shown in FIG. 2 where

DETAILED DESCRIPTION

The end-etching technique of this application is developed in part based on the recognition that wet etching at the meniscus interface between the etching liquid and the fiber can be difficult to control due to the instability and inconsistency of the meniscus interface due to various factors.

One problem, among others, of meniscus-based wet etching methods is that the etched surface in the tapered fiber section of the fiber tip often appears porous. Such a porous tip surface may cause adverse leakage of light near the tip region and thus can lead to reduced signal strength and signal-to-noise ratio.

The meniscus interface by nature is generally sensitive to any variation at the interfacing region between the fiber and the etching liquid, such as environmental variations caused by vibrations, thermal fluctuations, and other environmental factors. Independent from the environmental variations, the meniscus interface may change during the etching process when the composition of the etching liquid varies and when the tapered shape of the fiber changes due to the etching. Furthermore, the meniscus interface may not be easily consistently controlled when there is a variation in the property of the etching liquid, the protective oil over the etching liquid, and the fiber structure.

Figure 1:
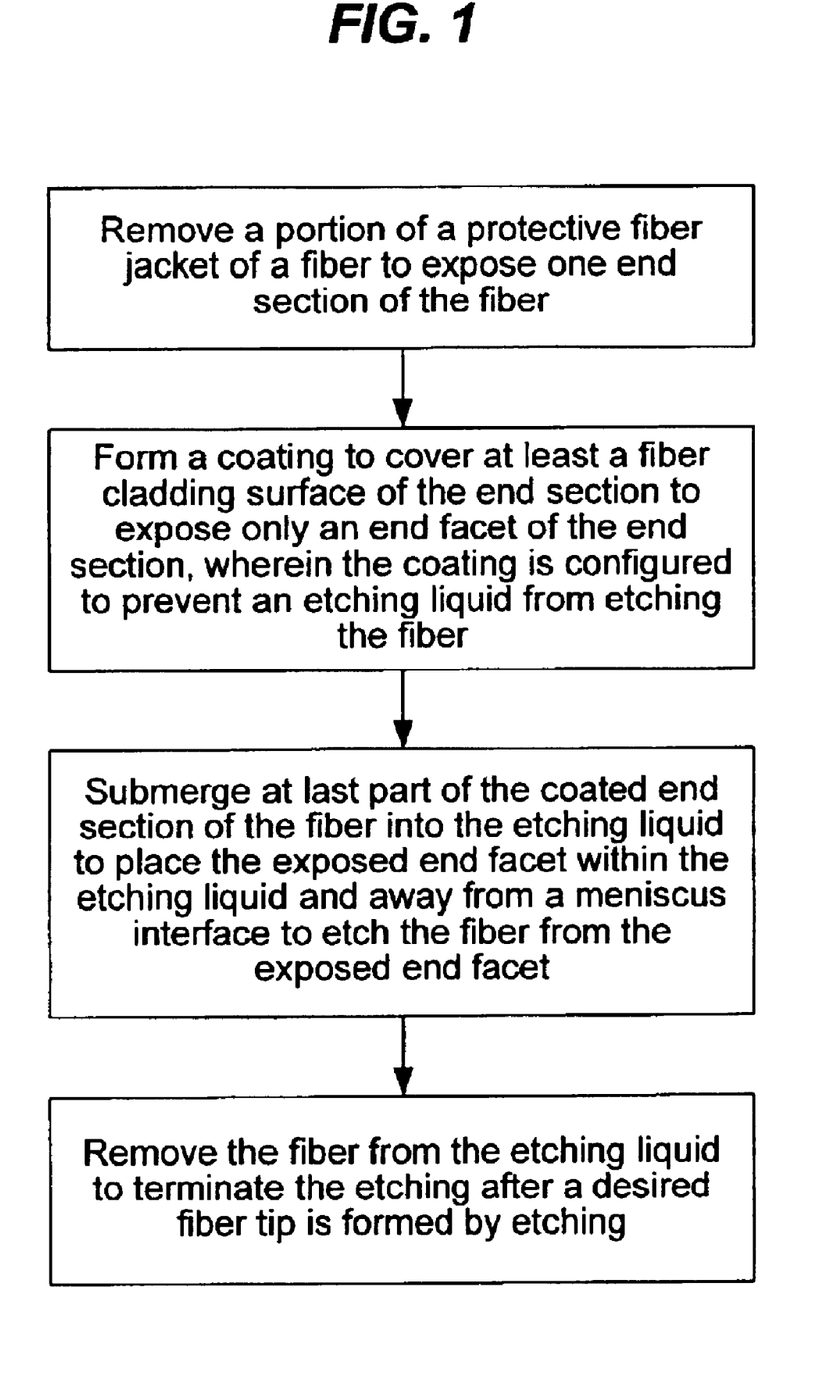
FIG. 1 shows one implementation of the end etching process of this application.

The end-etching technique of this application is designed to do away with etching at the meniscus interface and thus to avoid the above and other technical difficulties associated with etching at the meniscus interface. FIG. 1 is a flow chart that illustrates the general approach of the end-etching process in one implementation. As illustrated, a portion of the fiber jacket surrounding the fiber cladding is removed to expose one end section of the fiber. A coating layer is applied around the bare fiber to expose substantially only an end facet of that fiber section. The coating layer may be made of a material that is not chemically reactive to the etching liquid and may vary with the specific etchant in the liquid. The exposed end facet is then immersed into the etching liquid and is positioned away from the meniscus interface during the etching process. After the desired fiber tip is formed, the fiber is then removed from the etching liquid to terminate the end etching process. Due to the protection of the coating, the etching at the meniscus surface is essentially prevented and the fiber is most strongly etched within the etching liquid directly from the end facet. This approach can provide a consistent etching mechanism to form high-quality fiber probes with a small tip apex, a short tapered section and a smooth tip surface.

Figure 2:
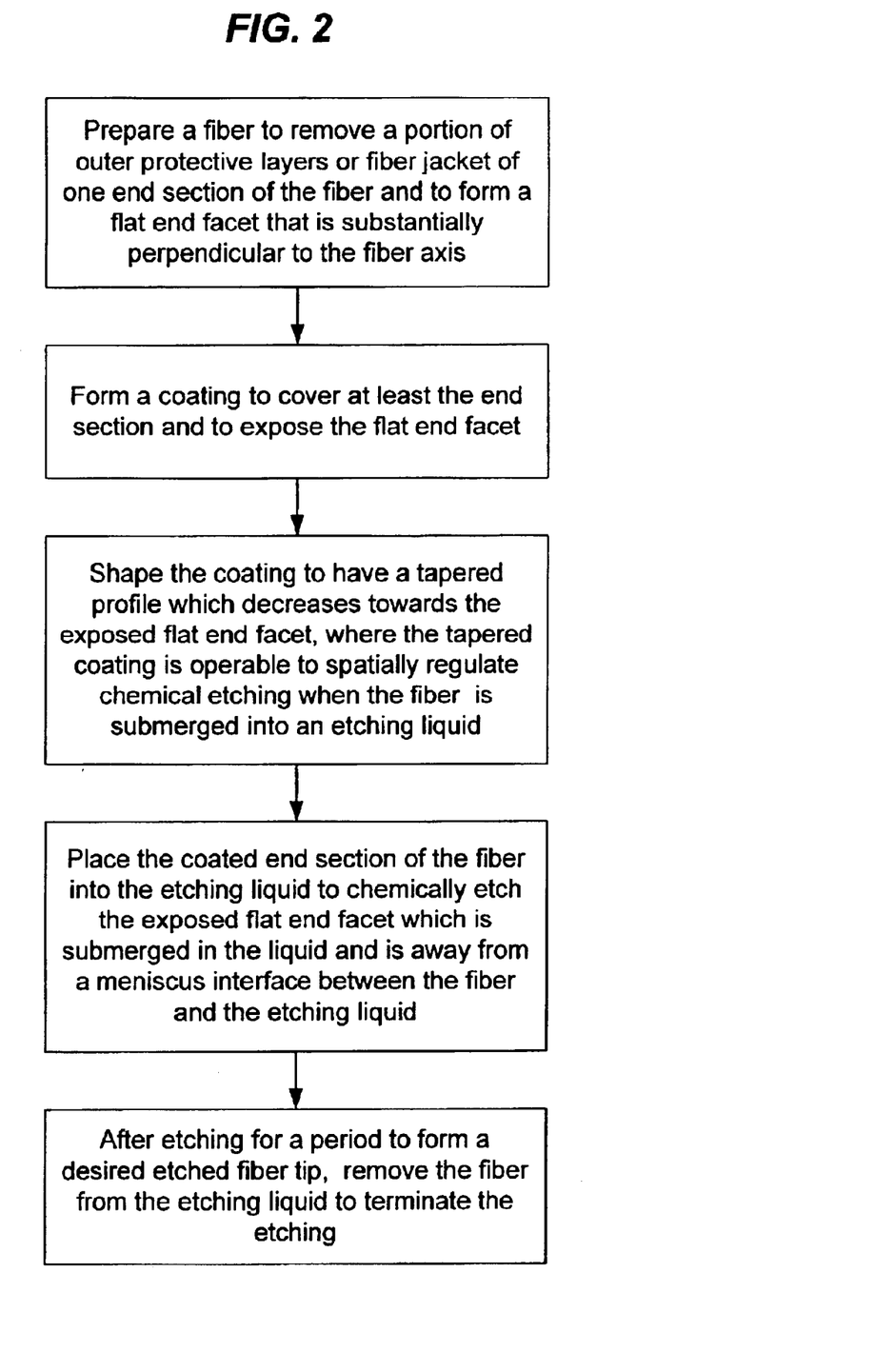
FIG. 2 shows another implementation of the end etching process of this application.

Notably, the coating layer may be shaped to have a tapered profile which decreases towards the end facet. This feature provides a spatial regulation mechanism for regulating the degree of etching of the coated fiber from the exposed end facet. FIG. 2 further shows the flow chart for an end-etching process that includes this feature. The coating layer may be a plastic material. When immersed in the etchant solution, the permeability of the etchant (e.g., HF) into the fiber is spatially regulated by the spatial variation in the thickness of the tapered coating layer. Therefore, a tapered fiber tip can be formed by so regulated etching without relying on the meniscus interface. Hence, in the presence of the tapered coating, the strongest etching occurs at the end facet of the fiber and the strength of the etching on the side of the fiber decreases as the thickness of the tapered coating increases. Testing results have demonstrated that the end-etching method can provide smoother surface than previous chemical etching methods. Furthermore, this method is insensitive to vibrations, temperature fluctuations and suitable for etching various kinds of fibers.

Figures 3A, 3B:
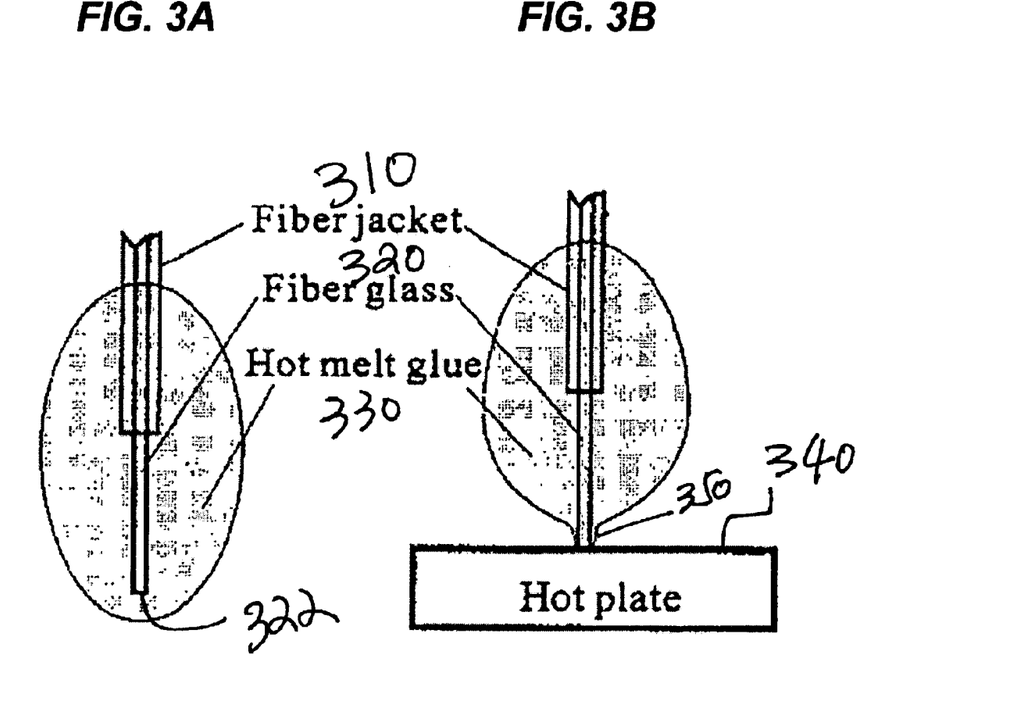
FIG. 3A shows that a bare-fiber end with a flat end facet is glued with a thick layer of a plastic material.
FIG. 3B shows that the coated fiber is placed on a hot plate to form a plastic taper at the fiber end.
Figure 3C:
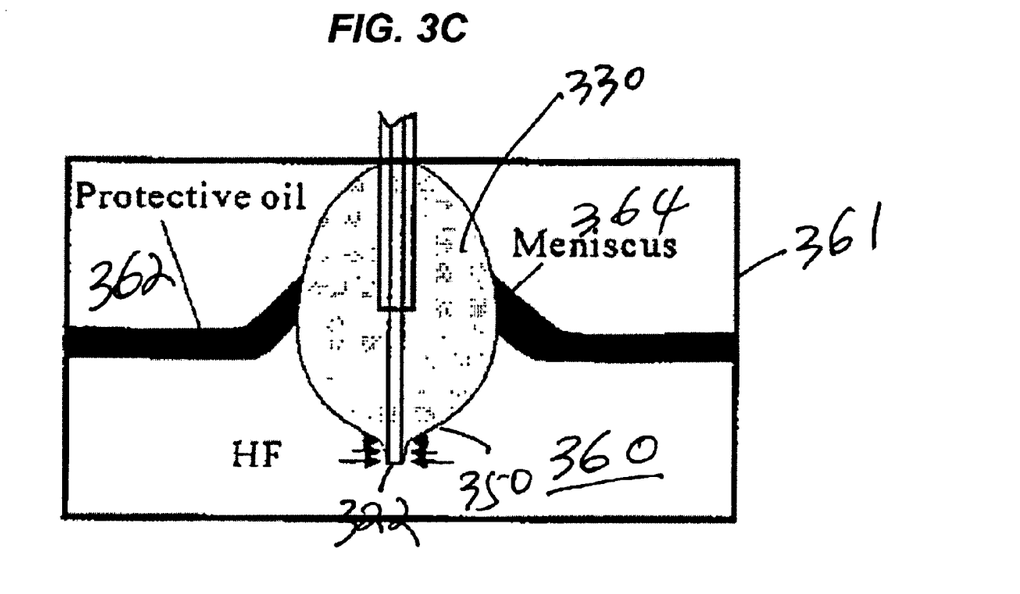
FIG. 3C shows that the fiber with plastic tapered end is immersed in a 40% HF solution and etched for a period of time.
Figure 4A:
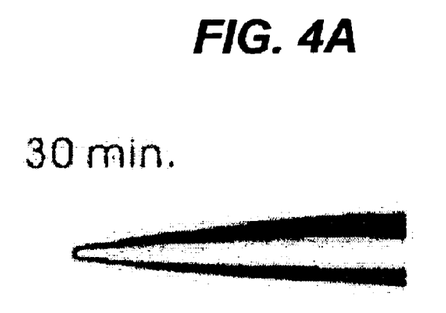
FIGS. 4A, 4B, 4C, and 4D show optical images of wet-etching fibers with etching times at 30, 60, 90 and 120 minutes, respectively, by using the above end-etching process.
Figure 4B:
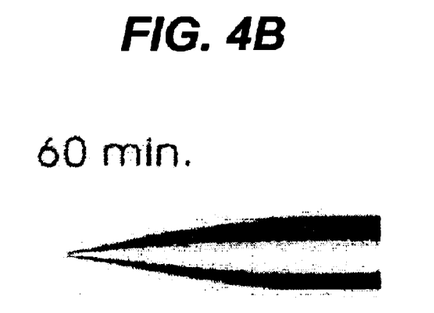
Figure 4C:
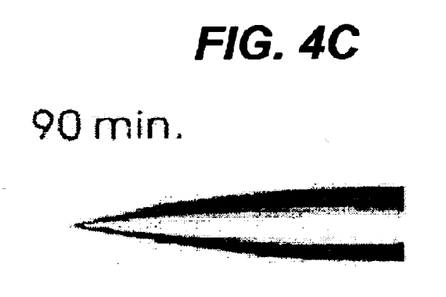
Figure 4D:
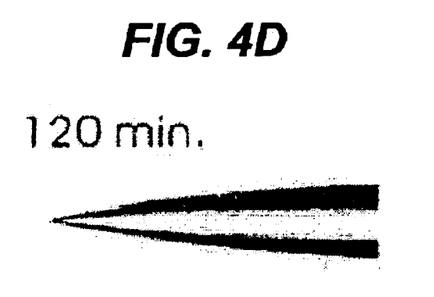

FIGS. 3A, 3B, and 3C illustrate the detailed fabrication process using the end-etching method according to one implementation. As shown in FIG. 3A, the fiber jacket 310 is removed to expose one end section 320. The end section 330 of the bare fiber is cleaved to have a flat surface 322, which may be substantially perpendicular to the fiber axis along the fiber. The end section 320 and possibly some of the adjacent fiber with the fiber jacket of fiber are then coated with a relatively thick coating layer 330, e.g., about one or several millimeters, by using a suitable plastic material such as a thermal melt glue.

FIG. 3B shows the process for shaping the coating layer into a tapered profile. The end of the fiber is placed on a hot surface of a hot plate 340 at an elevated temperature above the melting point of the plastic coating layer 330. Because of the heat convection on the hot plate 340, the cylindrical plastic layer 330 shrinks and forms a tapered shape at the end region 350 of the coating layer 330. This operation completes the preparation for the end-etching process.

Next as shown by FIG. 3C, the fiber with tapered plastic coating layer and the flat end is immersed in an etching liquid 360 in a container 361. The etching liquid 360 may be, for example, a HF (40%) solution at the room temperature. A protective layer 362, such as an oil, may be placed over the HF surface to prevent the vaporization of the etching liquid HF 362.

Notably, the end facet 322 and the tapered section 350 are positioned within the etching liquid 360 and are away from the meniscus interface 364 formed at the plastic coating 330, the etching liquid HF 360, and the protective oil layer 362. Hence, the meniscus interface 364 is not contributed to the etching. This is also because the plastic coating 330 is purposely designed to be sufficiently thick such that the permeability of the etching liquid 360 at the position of the meniscus interface 364 is negligible to effect any significant etching. Therefore, the etching of the fiber at the meniscus interface 364 is essentially prevented. In particular, only the tapered end 350 of the coating 330 is thin enough to allow the etching liquid 364 to permeate through and to chemically etch the fiber and the strength of the etching is controlled by the tapered profile. After etching for a specified period when the desired tapered fiber tip is formed, e.g., from several minutes to tens of minutes or even longer, the fiber is removed and rinsed successively with deionized water and acetone. The plastic coating 330 is then removed. The hot melt glue coating, e.g., may be dissolved in the acetone; no other process is needed to remove it. This can ensure that the etched fiber tip is not damaged after it is formed. In actual fabrication, multiple fibers may be processed and etched at the same time to produce a batch of fiber probes.

Figure 5A:
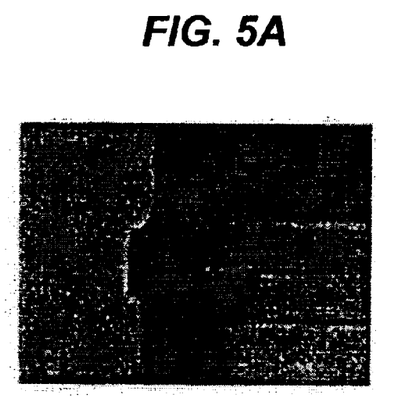
FIGS. 5A and 5B respectively show optical images of the fiber coated with a plastic taper formed at 80° C. on the hot plate and the resultant fiber tip after end-etching.
Figure 5B:
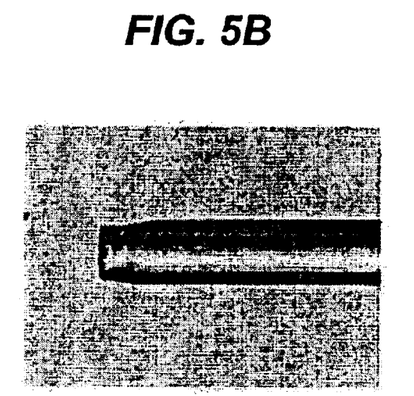
Figure 6A:
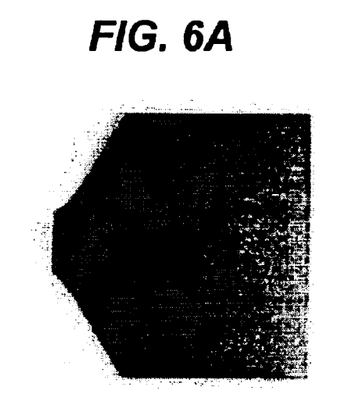
FIGS. 6A and 6B respectively show optical images of the fiber coated with a plastic taper formed at 100° C. on the hot plate and the resultant fiber tip after end-etching.
Figure 6B:
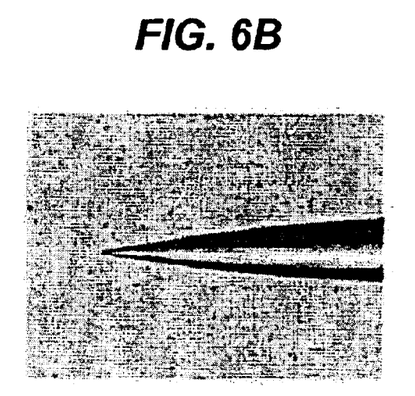
Figure 7A:
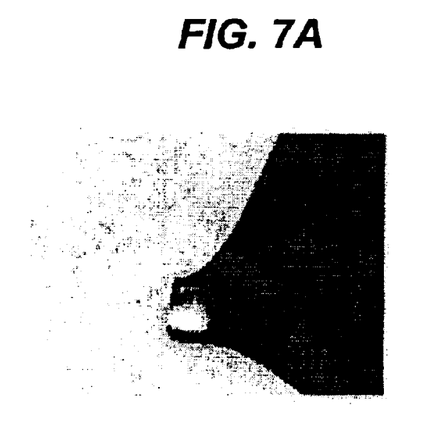
FIGS. 7A and 7B respectively show optical images of the fiber coated with a plastic taper formed at a 120° C. on the hot plate and the resultant fiber tip after end-etching.
Figure 7B:
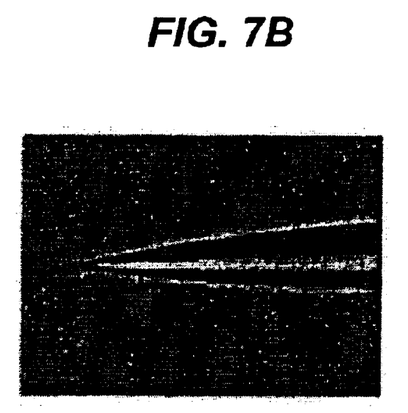

FIGS. 4A through 4D show optical images of single-mode fiber probes made from fibers manufactured by SpecTrans Specialty Optics Co. for different etching times by using the above end-etching method. It can be seen that the chemical etching indeed only occurred at the end region where the plastic coating is tapered. To verify that etching process is due to the tapered shape of plastics, different plastic tapers have been made and used by varying the temperature on the hot plate. FIGS. 5A through 7B show fiber probes made from three different tapered coatings after end-etching for about one hour. The temperatures of the hot plate are about 80° C., 100° C., and 120° C., respectively. The plastic layer for 80° C. heating shown in FIG. 5A is almost flat at the end. After HF etching, no tapered region is formed. FIG. 6A shows the tapered plastic coating formed at 100° C. After etching, a smooth tapered region is formed (FIG. 6B). Referring to FIG. 7A, the 120° C. sample has a longer tapered end section in the coating due to a higher heating at the end face. After etching for one hour, a longer tapered shape is formed (FIG. 7B). The above results demonstrate and verify that, shapes of fiber probes can be controlled by the taper geometry of the plastic coating layer.

Figure 8A:
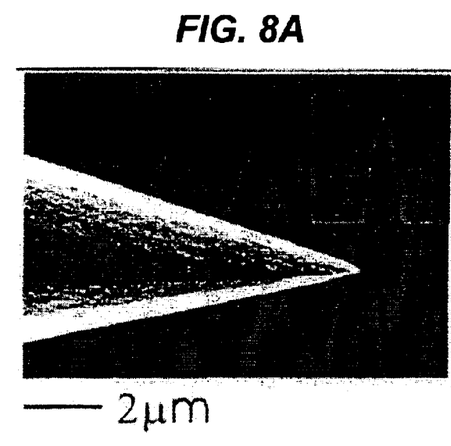
FIGS. 8A and 8B are scanning electron microscope (SEM) images of fiber tips formed from the end-etching method of this application and the protective jacket method, respectively, where the fibers are identical SpecTran fibers and are etched in HF for 60 minutes.
Figure 8B:
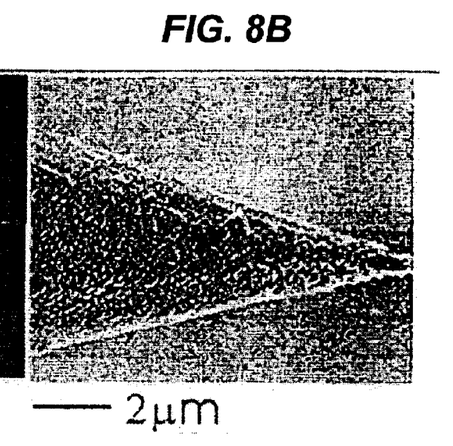

FIGS. 8A and 8B show images of fiber probes to compare fiber probes fabricated by the end-etching method and the protective jacket method in the cited Lambelet article. The inset in FIG. 8A shows the optical spot at the tip by coating 70 nm thickness of Au. The etching time is 60 minutes. FIG. 8A shows smooth surface for a fiber tip fabricated by the end-etching method, where the insert shows the optical spot at the fiber tip by coating a layer of Au of about 70 nm in thickness around the tip. The wavelength of the light used is 632.8 nm. The image does not show any significant leakage of light. In comparison, FIG. 8B shows a fiber tip fabricated by the protective jacket method by etching in 40% HF solution for 60 minutes. The resultant fiber tip shows rougher surface than the fiber tip in FIG. 8A. In general, the quality of fiber tips made from meniscus etching with the protective jacket method varies with the quality of the fiber jacket. In contrast, consistent high-quality fiber tips can be fabricated even for bad-conditioned fibers in protective jacket method. Repeated tests using the end-etching method show that, the average yield for good tips after end-etching is up to about 90%. Hence, high-quality tapered fibers are highly reproducible and reliable by using the end etching method.

Figure 9A:
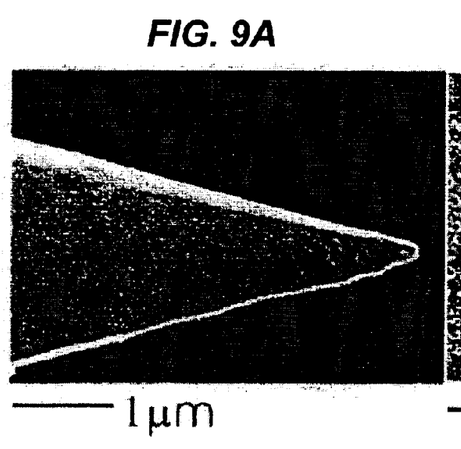
FIGS. 9A and 9B are SEM images of fiber tips formed from the end-etching method of this application and the protective jacket method, respectively, where the fibers are identical 3M fibers and are etched in a 40% HF solution with a layer of a protective oil on top of the HF surface for 60 minutes.
Figure 9B:
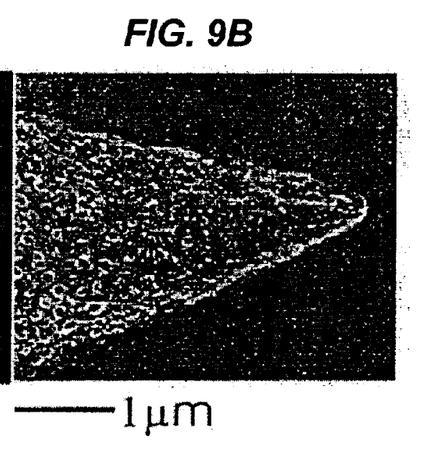
Figure 10A:
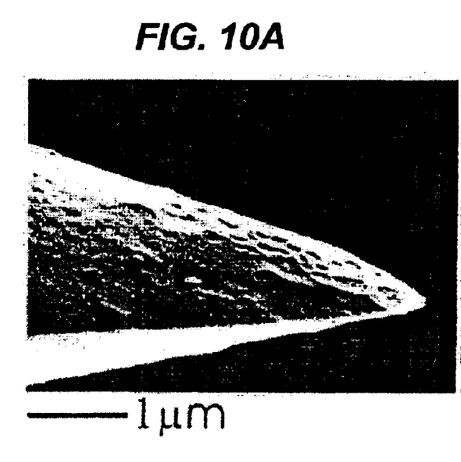
FIGS. 10A and 10B are SEM images of fiber tips formed from the end-etching method of this application and the protective jacket method, respectively, where the fibers are identical Prime fibers and are etched in a 40% HF solution with a layer of a protective oil on top of the HF surface for 60 minutes.
Figure 10B:
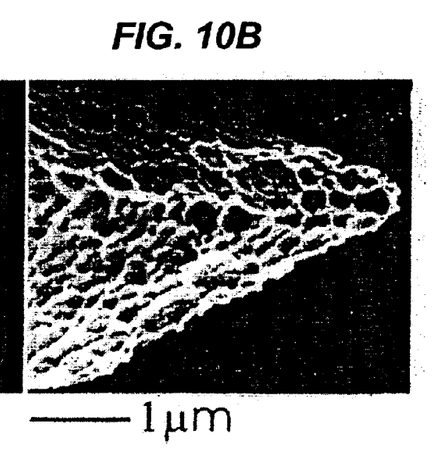

FIGS. 9A through 10B show additional comparisons between the end-etching method and the protective jacket method for 3M single-mode and multi-mode fibers (FS-SN-3224 and FS-SC-6324 and Prime optical fibers: G625A and multimode fibers). FIGS. 9A and 9B show images of fiber tips made from 3M fiber (FS-SC-6324) wherein the fiber tip in FIG. 9A is fabricated by using the end-etching method and the fiber tip in FIG. 9B is fabricated by using the protective jacket method. 3M fibers are generally known to be suitable for the protective jacket method. The comparison shows that the end-etching method can produce the smoother fiber tip. FIGS. 10A and 10B show fiber tip images for fiber tips made from a Prime optical fiber (G625A). FIG. 10A is the result by the end-etching method. FIG. 10B is the result by protective jacket method. The Prime optical fibers are generally poor for protective jacket method. It is seen that a great improvement of surface condition is made by the end-etching method.

Hence, for wet-etching methods that etch fiber from the side based on the meniscus interface to achieve a tapered shape, it can be difficult to control the stability of the meniscus interface during the etching process and instability at the meniscus interface can lead to poor surface conditions in the fiber tips. Although the protective jack method may be used to maintain the shape of meniscus, it may be effective only for limited fibers with good polymer coatings and may not produce high-quality fiber tips for various fiber coatings.

The end-etching method can be used to avoid these technical difficulties and to produce consistent high-quality fiber tips from various commercial fibers. The end-etching method generally does not require control of vibrations or control of the temperature control and thus greatly simplifies the fabrication system.

Only a few exemplary implementations are disclosed. However, it is understood that variations and enhancements may be made without departing from the spirit of and are intended to be encompassed by the following claims.

What is claimed is:

1. A method, comprising:
   preparing a fiber to remove a portion of outer protective layers of one end section of the fiber and to form a flat end facet;
   forming a coating to cover at least the end section and to expose the flat end facet;
   shaping the coating to have a tapered profile which decreases towards the exposed flat end facet, where the tapered coating is operable to spatially regulate chemical etching of the fiber when the fiber is submerged into an etching liquid;
   immersing the coated end section of the fiber into the etching liquid to chemically etch the exposed flat end facet which is submerged in the liquid and is away from a meniscus interface between the fiber and the etching liquid; and
   after etching for a period to form a desired etched fiber tip, removing the fiber from the etching liquid to terminate the etching.

2. The method as in claim 1, wherein the tapered profile of the coating is achieved by placing the coated end section over a hot surface at an elevated temperature above a melting temperature of the coating to have the exposed end facet in contact with the hot plate for a period.

3. The method as in claim 2, further comprising configuring the coating to be sufficiently thick at the meniscus interface to substantially prevent the etching liquid from permeating through the coating.

4. The method as in claim 1, further comprising using a plastic material which is not chemically reactive to the etching liquid to form the coating.

5. The method as in claim 1, wherein the exposed flat end facet is substantially perpendicular to the fiber axis.

6. The method as in claim 1, further comprising using a HF solution as the etching liquid.

7. A method, comprising:
   removing a portion of a protective fiber jacket of a fiber to expose one end section of the fiber;
   forming a coating to cover at least a fiber cladding surface of the end section to expose only an end facet of the end section, wherein the coating is configured to spatially regulate an etching liquid from etching the fiber;
   submerging at last part of the coated end section of the fiber into the etching liquid to place the exposed end facet within the etching liquid and away from a meniscus interface to etch the fiber from the exposed end facet; and
   removing the fiber from the etching liquid to terminate the etching after a desired fiber tip is formed by etching.

8. The method as in claim 7, further comprising shaping the coating to have a tapered profile which decreases towards the end facet.

9. The method as in claim 8, wherein the tapered profile of the coating is achieved by placing the coated end section over a hot surface at an elevated temperature above a melting temperature of the coating to have the exposed end facet in contact with the hot plate for a period.

10. The method as in claim 8, further comprising configuring the coating to be sufficiently thick at the meniscus interface to substantially prevent the etching liquid from permeating through the coating.

11. The method as in claim 7, further comprising using a plastic material which is not chemically reactive to the etching liquid to form the coating.

12. The method as in claim 7, wherein the exposed end facet is substantially flat.

13. The method as in claim 7, wherein the exposed end facet is substantially perpendicular to the fiber axis.

14. The method as in claim 7, further comprising using a HF solution as the etching liquid.

15. A method, comprising:

applying a coating layer around a bare fiber to expose only an end facet of the bare fiber; and placing the exposed end facet into an etching liquid to be away from a meniscus interface between the etching liquid and the fiber to etch the fiber from the end facet.

16. The method as in claim 15, further comprising shaping the coating layer to have a tapered profile which decreases towards the end facet.

17. The method as in claim 16, wherein the tapered profile of the coating layer is achieved by placing the coated end section over a hot surface at an elevated temperature above a melting temperature of the coating to have the exposed end facet in contact with the hot plate for a period.

18. The method as in claim 16, further comprising configuring the coating to be sufficiently thick at the meniscus interface to substantially prevent the etching liquid from permeating through the coating.

19. The method as in claim 15, further comprising using a plastic material which is not chemically reactive to the etching liquid to form the coating layer.

20. The method as in claim 15, wherein the exposed end facet is substantially perpendicular to the fiber axis.

* * * * *